United States Patent [19]

Siems et al.

[11] 4,023,140

[45] May 10, 1977

[54] SEISMIC DATA TELEMETERING SYSTEM

[75] Inventors: Lee E. Siems; Paul M. Morgan, both of Houston, Tex.

[73] Assignee: Western Geophysical Company of America, Houston, Tex.

[22] Filed: Mar. 8, 1976

[21] Appl. No.: 665,151

Related U.S. Application Data

[63] Continuation-in-part of Ser. No. 576,943, May 12, 1975, Pat. No. 3,996,553.

[52] U.S. Cl. .................. 340/15.5 TS; 179/15 BL; 179/15 AL; 340/151; 340/152 T; 340/183
[51] Int. Cl.² .......................................... G01V 1/22
[58] Field of Search ........ 179/15 A, 15 BL, 15 AL; 340/15.5 TS, 15 DP, 151, 152 T, 183, 16 C

[56] References Cited

UNITED STATES PATENTS

3,881,166  4/1975  Fort et al. .................. 340/15.5 TS

*Primary Examiner*—Howard A. Birmiel
*Attorney, Agent, or Firm*—William A. Knox

[57] ABSTRACT

A plurality of data acquisition and transceiver units are connected in series to a central signal processor through a common telemeter link. The telemeter link includes a data channel, an interrogation channel and a control channel. The signal propagation velocity through the control channel may, for example, be greater than the signal propagation velocity through the interrogation channel. The central signal processor sends an interrogation signal through the interrogation channel to the data acquisition units. After a selected delay, a control pulse is transmitted. The delay between transmissions of the two signals is proportional to the differential travel time of the signals in the two channels. Accordingly the signal through the control channel will overtake and intercept the signal propagating through the interrogation channel, at a selected data acquisition unit. When any selected data acquisition unit receives a control signal through the control channel at the same time that it receives an interrogation signal through the interrogation channel, that unit is activated and a desired function is performed. The control signal is a square wave pulse having a width which is adjustable by integral multiples of the differential travel time. By adjusting the width and transmission-time delay of the control pulse, any selected subset of one or more consecutive units may be activated. Each data acquisition unit may have two or more input channels, which are connected in turn through common electronics to the data transmission channel by means of a channel selector or multiplexer. The interrogation signal may exist in one of two or more states. In the first state, in combination with a control pulse, the interrogation signal resets the multiplexer. In the second state, the interrogation signal advances the multiplexer to the next input channel in sequence.

28 Claims, 6 Drawing Figures

SEISMIC DATA TELEMETERING SYSTEM

BACKGROUND OF THE INVENTION

Relation to Other Applications

This is a continuation-in-part of co-pending U.S. Patent application Ser. No. 576,943, filed May 12, 1975, now U.S. Pat. No. 3,996,553, (DDS-119) assigned to the same assignee.

In addition, this application forms a part of a group of patent applications filed concurrently, having the following attorney's docket numbers, serial numbers, titles and inventor(s):

WG 229 SEISMIC METHOD AND SYSTEM OF IMPROVED RESOLUTION AND DISCRIMINATION - Carl H. Savit. Ser. No. 665,150

LRS 120 MULTIPLEXER COMMUTATED HIGH PASS FILTER - Lee E. Siems. Ser. No. 664,614

LRS 121 GAIN RANGING AMPLIFIER SYSTEM - George Mioduski. Ser. No. 664,616

LRS 124 DECENTRALIZED SEISMIC DATA PROCESSING SYSTEM - Lee E. Siems et al. Ser. No. 664,618

LRS 126 MULTIPLEXER OFFSET REMOVAL CIRCUIT - Lee E. Siems. Ser. No. 664,615

LRS 127 SEISMIC CABLE TELEMETRY SYSTEM - Lee E. Siems et al. Ser. No. 664,617

FIELD OF THE INVENTION

This invention relates to a telemetry system for transmission of seismic data to a central recorder through a single data transmission channel.

RELATED PRIOR ART

In seismic exploration, acoustic signals are injected into the earth. The acoustic signals radiate downwardly and are reflected from subsurface formations. The reflected acoustic signals then return to the earth's surface where they are detected by a plurality of seismic sensors or sensor groups. Seismic sensors are deployed in groups of up to 30 sensors along a cable with a spacing between sensors of 10 to 20 feet. The sensors are electrically connected to form a single input channel. A plurality of groups may be distributed along a multiconductor cable system which typically may be as long as 10,000 feet. The detected, reflected acoustic signals are then transmitted to a central signal-recording system.

In accordance with conventional seismographic surveying practice the sensor groups are located along the cable at increasingly greater distances from the recording system. There is, therefore, a nearest and farthest sensor group relative to the recording system. Commonly the plurality of seismic sensor groups transmit data to the recording system through a like number of physically separate transmission channels, typically two-wire cables. Whereas previously, standard practice called for use of about 50 data channels, modern exploration may require 500 channels of data. It would be desirable, therefore to substitute many shorter seismic sensor arrays instead of one long seismic sensor array in each cable section. Such a possibility has been considered to be impossible in view of the data processing complexities and the large number of conductors that would have been required, resulting in seismic cable assemblies of impractical size and bulk.

In a single-channel, time-multiplexed system of the prior art involving fewer channels the recording system polls each sensor group in sequence and identifies the individual sensor groups by an address unique to that sensor group. Alternately, various clocking schemes have been proposed wherein each sensor group has a unique response to one or more clocking signals emitted by the recording system. The previously suggested telemetry systems have a common characteristic in that each sensor must in some physical way, be unique and distinguishable from the other sensor groups on a per-channel basis. Additionally in the case of a multichannel sensor-group array, complex addressing systems must be used to change channel assignments, as various senors are advanced in accordance with the so-called common depth point seismic exploration method. Thus, if each one of a large number of sensor groups must be identified uniquely, there is a likeihood of erroneous group identification.

In co-pending U.S. patent application, Ser. No. 446,862, now U.S. Pat. No. 3,990,036, entitled "MULTIPLEXING METHOD AND APPARATUS FOR TELEMETRY OF SEISMIC DATA", assigned to the same assignee, there is disclosed a method and apparatus whereby a large number of identical sensor groups are employed and in which unique addressing for each group is unnecessary.

Because of the expense and physical limitations imposed by the hundreds of wires required in a cable to provide separate channels for a large number of individual seismic sensor groups, the total number of groups that can be deployed initially at any one time was limited.

SUMMARY OF THE INVENTION

This invention provides a method for initiating a desired switching sequence in at least one of a plurality of data acquisition or transceiver units. The acquisition units are positioned in a desired pattern at locations remote from a central signal processor which includes a control-signal transmitter. The acquisition units are substantially equally spaced from one another along one or more transmission links or channels. The acquisition units are connected to the control signal transmitter by two signal transmission links. The travel velocity of a signal through the first link is less than that through the second link. A first signal is transmitted through the first link to the plurality of data acquisition units. A second signal is transmitted through the second link after a preselected time delay following transmission of the first signal. The signal traveling through the second link overtakes the signal traveling through the first link at the selected data acquisition unit. When the simultaneous presence of both signals is detected at the selected data acquisition unit, the desired switching sequence is initiated.

The invention also provides a method for initializing a desired switching sequence or scan cycle in all of the acquisition units. The first signal may be characterized by one of a plurality of properties or states. When the state of the first signal is identified, a desired switching action is initiated in all of the data acquisition units in turn, in response to the particular state of the first signal.

This invention further provides a system for transmission and selective control of sub-multiplexed seismic data over a signal transmission link to a central signal processor. A plurality of data acquisition units are connected to a central signal processor through the signal transmission link. The data acquisition units are evenly spaced apart from one another in an array at increasingly greater distances along the transmission link from the central processor. The signal transmission link includes an interrogation channel, a control channel, and a data channel. The signal propagation velocity through the interrogation channel is different from the propagation velocity through the control channel.

Associated with each data acquisition unit are a plurality of analog data input channels, a multiplexer or channel-selector, an analog-to-digital converter, and an output signal storage register. The input signals from the input channels are multiplexed, converted to digital form, and temporarily stored in the output-signal storage means.

The output signal storage means of each data acquisition unit is connected to a recording means in the central processor through the data channel of the signal transmission link. The data acquisition units further are provided with an interrogation-signal-property identifier and first and second signal coincidence detectors.

At selected sample intervals, the controller transmits an interrogation signal through the interrogation channel to each data acquisition unit in sequence. The interrogation signal is characterized by one of a plurality of properties. When the signal-property identifier responds to an interrogation signal having a first property, it resets the multiplexer. When the signal-property identifier detects a signal having a second property, it advances the multiplexer and outputs data from the output signal storage register to the data channel for transmission to the recording means. Additionally, any given data acquisition or transceiver unit receives, regenerates, and retransmits data arriving from more remote units.

At a preselected time, different from the time of transmission of the interrogation signal, a control signal may be transmitted through the control line by the control means. The preselected time difference is $(n-1)R$, where $n$ is an integer representing the rank of the $n$th data acquisition unit and $R$ is the signal travel time difference of the signal through the interrogation and control channels between any two data acquisition units.

The interrogation signal is preferably a pulse of preselected duration or width. The property or state of an interrogation signal which is employed as a control parameter in the presently disclosed system is the width of the pulse. A wider pulse is defined as having a first property; a narrower pulse is defined as having a second property or state. The width of a narrower pulse is preferably about one-half the width of a wider pulse. The width of a wider pulse is preferably less than one-half of the preselected sample interval.

In accordance with an important aspect of this invention, a desired switching sequence is initiated in the members of a desired subset of consecutive data acquisition units, the subset being selected from the plurality of data acquisition units. The subset includes a first selected unit and a last selected unit. An interrogation pulse in the first state is transmitted from the central processor through the interrogation channel. After a selected time delay, a long control pulse is transmitted through the control channel. The leading edge of the long control pulse overtakes and intercepts the interrogation pulse in the first state at the first selected unit. The trailing edge of the long control pulse overtakes and passes ahead of the interrogation pulse at all units beyond the last selected unit. The length of the long control pulse is equal to a first integral multiple of the signal travel time difference through the two channels between any two data acquisition units. The desired switching sequence will occur only in those units where the interrogation and control pulses are substantially simultaneously present. The first integral multiple is equal to the number of members, less one, included in the subset. The selected time delay is a second integral multiple of the signal travel-time difference between any two data acquisition units, the second multiple being equal to the number of units intervening between the first selected unit and the central processor.

In accordance with a further feature of this invention, three parallel control channels are provided. A majority vote circuit at each data acquisition unit is coupled to the three control channels. A delayed long control pulse is transmitted through the three control channels in parallel. Simultaneous reception at a data acquisition unit of an interrogation pulse in the first state through the interrogation channel and a long control pulse through at least any two of the three control channels initiates a first desired switching sequence.

In accordance with another feature of this invention a delayed short control pulse is transmitted through the first one of the three control lines. Simultaneous arrival at a selected data acquisition unit of an interrogation pulse in the first state and a delayed short control pulse through the first control channel, initiates a second desired switching action.

In accordance with yet another aspect of this invention, a third desired switching action in a selected data acquisition unit is initiated by the simultaneous arrival of an interrogation pulse in the first state through the interrogation channel and a delayed short control pulse through the second one of the three control lines.

In accordance with an additional aspect of this invention, a fourth desired switching action in a selected data acquisition unit is initiated by the simultaneous arrival of an interrogation pulse in the first state through the interrogation channel and a delayed short control pulse through the third one of the three control lines.

In another embodiment of this invention, interrogation and control pulses are repeatedly transmitted to the data acquisition units as short sample intervals, which may be less than one millisecond. The width of the control pulse is adjusted to enable the desired switching sequence in at least some of the data acquisition units. For example, half of the units closest to the central processing unit may be activated. The number of pulse transmissions may be on the order of 500 to 1000 such transmissions, extending over a time period of ½ to 1 second. Thereafter, the width of the control pulse adjusted so as to enable the desired switching sequence in all of the data acquisition units. At the same time, the pulse-transmission repetition interval is increased to one or two or more milliseconds. Additional pulse transmissions may then number from 1000 to 6000 or more such transmissions, to complete a recording cycle.

In accordance with a further aspect of this invention, interrogation and control pulses are repeatedly transmitted to the data acquisition units at preselected sample intervals after a first recording cycle is initiated. The width and time of transmission of the control pulse are adjusted to enable a desired switching sequence in a first subset of data acquisition units containing a preselected number of member units. After the first recording cycle has been completed, a second recording cycle is initiated and the width and time of transmission of the control pulse are adjusted to enable a desired switching sequence in a second subset of data acquisition units. The above steps may be repeated a plurality of times to provide a means for enabling a desired switching sequence in successive subsets of consecutive data acquisition units.

In accordance with yet another aspect of this invention, the width of the control pulse remains constant for each recording cycle. The time of transmission of the control pulse is delayed, with respect to the transmission time of the interrogation pulse for each recording cycle, by a different integral multiple of the signal travel-time difference or delay between any two units. For example, by increasing the delay by one unit multiple after each recording cycle, successive subsets of data acquisition units will be enabled consecutively, thereby providing the desired roll-along capability as previously described.

By use of a single, time-delay multiplexed, telemeter link, it now becomes economical and practical initially to deploy an indefinite number of seismic sensor units. Use of a single telemeter link reduces the bulk of the seismic cables such that the desideratum of providing 500 to 1000 separate data channels now may be achieved.

BRIEF DESCRIPTION OF THE DRAWINGS

These and other features and advantages of this invention will be better understood by reference to the accompanying detailed description taken in conjunction with the drawings wherein.

DETAILED DESCRIPTION OF THE INVENTION

Figure 1:
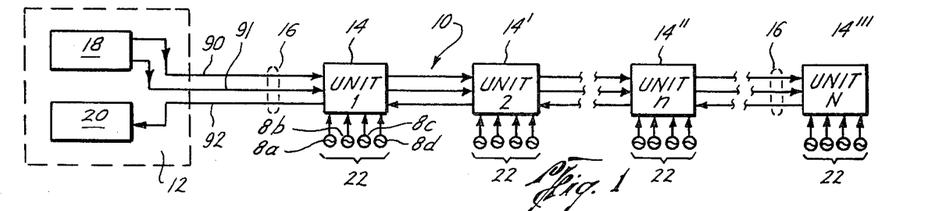
FIG. 1 is a schematic representation of a multi-channel seismic data telemetry system showing the data acquisition units interconnected through a multichannel telemetry link to a central signal processor.

FIG. 1 is an overall schematic illustration of a seismic data telemetry system generally shown as 10. System 10 includes a central data processor 12, and a plurality of identical spaced-apart multichannel data acquistion or transceiver units 14, 14', 14'', 14'''. In a preferred embodiment the data acquisition units are interconnected in series to data processor 12, by a three-channel, signal-transmission telemeter link 16. For simplicity, four of the data acquisition units 14, 14', 14'', 14''' are shown but up to 100 or more such units may be used. Data acquisition units 14, 14', 14'', 14''' are disposed along a line at increasingly greater distances from data processor 12. Separation between the acquisition units is preferably constant, typically about 200 to 300 feet.

Central data processor 12 includes a control means 18 and a recording means 20. Recording means 20 may be a magnetic tape recorder of any well known type. Control means 18 includes a signal transmission means such as a clock circuit of any well known type for transmitting a multi-state interrogation signal at preselected sample intervals and/or a control signal through channels 90 and 91, respectively, of three-channel signal transmission link 16 which may be a telemeter system.

After each unit 14 has completed transmission of its local data, it receives, regenerates and retransmits to central processor 12, data from more remote data acquisition or transceiver units. Thus, the data acquisition unit 14, closest to processor 12, transmits its local data first and then receives and retransmits data from the remaining 99 units, assuming that there are 100 such units included in the system 10. The last data acquisition unit, of course transmits only its local data.

In a preferred embodiment of this invention, the interrogation signal has one of a plurality of states or properties. The preferred interrogation and control signals are square-wave pulses, although other types of signals may be used. The propagation velocity of a pulse through the interrogation channel 90 is different from the propagation velocity of a pulse through the control channel 91. For example, but not as a limitation, the propagation velocity is greater through the control channel 91 than through interrogation channel 90.

If and when a data acquisition unit, such as 14', becomes defective, it must be bypassed so that data transmitted from a more remote unit, such as 14'', will not be affected. A control pulse is transmitted from control means 18 over control channel 91. At a selected unit such as 14', the control pulse overtakes and becomes coincident with the interrogation pulse due to the different propagation velocities in channels 90 and 91. Coincidence of the two pulses at unit 14' will cause that unit to be bypassed.

Figure 2:
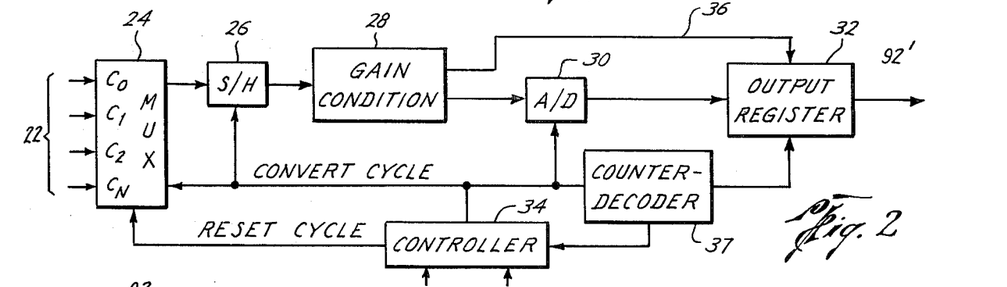
FIG. 2 shows the signal conditioning logic contained in each data acquisition unit.

Referring now to FIGS. 1 and 2, wherein like components bear the same numbers, the identical data acquisition units 14, 14', 14'', 14''' are provided with a plurality of input channels 22. The input channels may be connected to seismmic sensors 8a, 8b, 8c, 8d for example. Four input channels are shown, but fourteen or more may be employed. The units also contain signal-conditioning logic including a multiplexer 24, sample and hold circuit 26, gain-conditioning amplifiers 28, analog-to-digital converter 30, and an output signal storage means such as register 32. These common components interconnect the signal input channels 22 with data channel 92'.

The switching means or channel selector, such as the multiplexer 24 and sample and hold circuit 26 are of conventional types well known to the seismic art. Gain-conditioning amplifier 28 may be an instantaneous floating-point binary gain-ranging amplifier such as disclosed in co-pending U.S. patent application Ser. No. 664,616 assigned to the same assignee. The gain-coditioning amplifiers provide a four-bit gain code to indicate their gain setting for each data sample. The analog-to-digital (A/D) converter 30 may for example, be a Micronetics MN 5212 12-bit converter, although a converter of greater or lesser resolution may be used. Output signal storage means 32 may be conventional 16-20-bit serial-in, serial-out shift register. In a preferred embodiment, register 32 has a capacity at least for 12 data bits from the A/D converter and four gain code bits from the gain-conditioning amplifier.

A controller 34 is provided which is activated by signals S1 or S2 on lines S1 or S2, respectively. Signals S1 (scan-interval interrogation pulse) or S2 (submultiple interrogation pulse are generated in response to interrogation pulses having either a first state or a second state, respectively. The corresponding interrogation pulses, which are generally designated by the letters "IP", and which are transmitted over channel 90, are also designated S1 and S2, with S1 having one state (or width) and S2 having another state (or width). In response to a signal S1, the controller resets multiplexer 24 to channel 0, a dummy channel. In response to a signal S2, following a signal S1, controller 34 advances multiplexer 24 to the first input channel in sequence, to allow sample-and-hold 26 to sample an input from the first channel. It is to be understood that the S1 pulse sets controller 34 to enable output of data in response to S2 pulses for the duration of the scan cycle. The scan cycle is the multiplexer operation of sampling all fourteen of the respective input channels. The time or scan-interval required for one scan cycle depends on the sampling rate which may be 1000 samples per second or more.

The signal sample is amplified by the gain-conditioner 28 and is presented to A/D cconverter 30. In a preferred embodiment, the amplification factor is expressed as a 4-bit gain code. When the next S2 signal is received, the controller advances multiplexer 24 to the next channel and at the same time causes A/D converter 30 to convert the gain-conditioned sample from the first channel to a digital number. At the beginning of the convert cycle, the 4-bit gain code is transferred in serial order from gain conditioner 28 to output register 32 over line 36. As the A/D conversion proceeds, the 12 bits representing the digital number are sent serially to output register 32 from A/D converter 30. In register 32, the 12 data bits are combined with the four gain-code bits to form a 16-bit digital data word corresponding to the sample from the first channel. Four preamble bits may be added in one embodiment to provide a 20-bit word.

When the convert cycle for channel K (for example) begins, controller 34 transfers to data channel 92', the digital data word for channel k−1, previously resident in output register 32. Counter-decoder 37 counts the bits serially strobed out of register 32 and informs controller 34 to terminate the transfer of the data bits when the count is complete.

Figures 3, 4:
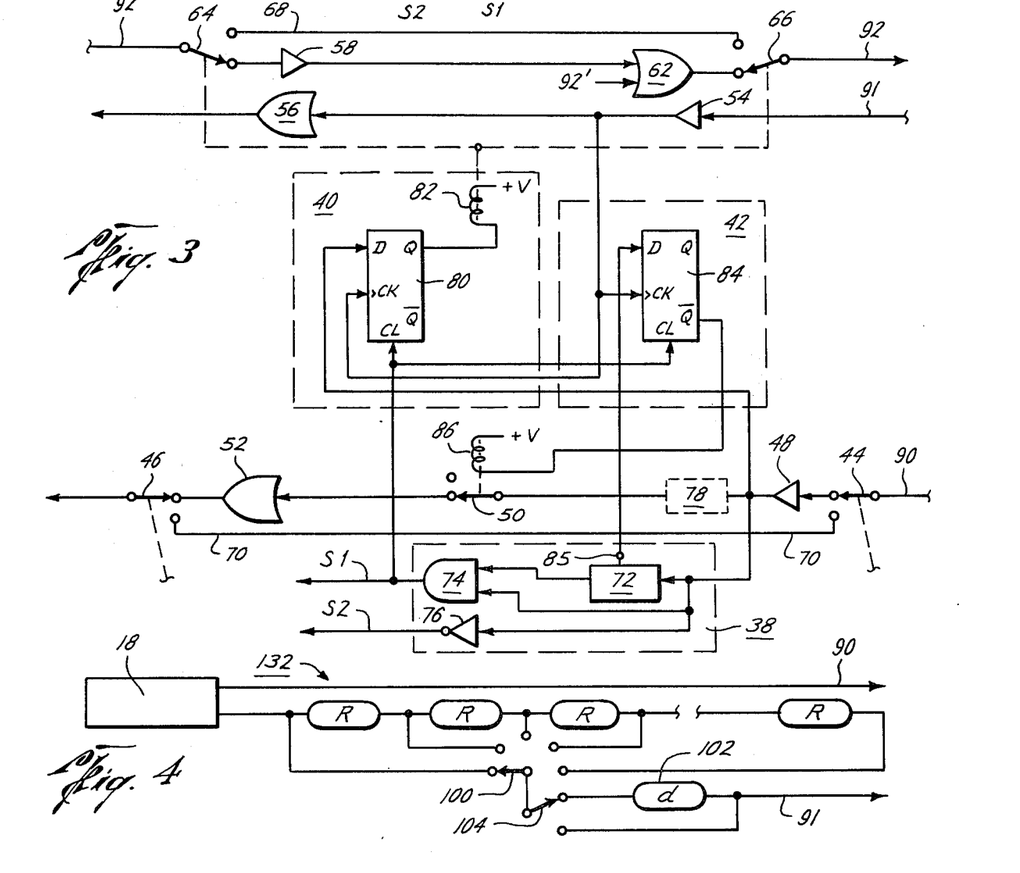
FIG. 3 is a diagram of the signal-property identifier and of the first and second signal coincidence detectors.
FIG. 4 illustrates a means for delaying transmission of a control signal following transmission of an interrogation signal and for applying a time shift to the control signal.

Referring now to FIG. 3, which shows certain details of one of data acquisition units 14, 14', 14'', 14''', including a signal-property identifier 38 annd first and second signal coincidence detectors 40 and 42, shown enclosed by dashed lines. Connected in series with interrogation channel 90 are power-loss bypass switches 44, 46, lines receiver 48, interrogation-signal disable switch 50 and line driver 52. Control channel 91 is provided with a line receiver 54 and a line driver 56. Data channel 92 is furnished with a line receiver 58, and an OR-gate/line driver 62. The two inputs to line driver 62 are the input 92 from down-line data acquisition or transceiver units and input 92' from the local data output register 32. Switches 64 and 66 cause data output to be bypassed over bypass line 68 when deactivated. Note that the direction of data flow in FIG. 3 is reversed with respect to FIGS. 1 and 4.

Signal-property identifier 38, consisting of tapped dalay line 72, AND-gate 74, and inverter 76, identifies the state of an interrogation signal in a manner now to be described. The interrogation signal is substantially a square wave, having a specified width. The state of a pulse is herein defined by its width, although with appropriate circuitry any other parameter thereof such as pulse height could also be used as a discriminant. A wide pulse defines an interrogation pulse in the first state. The width of a wide pulse must be greater than the delay time of delay line 72, but less than one-half of the preselected sample interval. An interrogation pulse in the second state must be clearly distinguishable from an interrogation pulse in the first state and preferably is less than half the width of a wide pulse. In a preferred embodiment, the delay time of delay line 72 is 1000 nanoseconds (ns), a wide pulse is 1200 ns long, and a narrow pulse is 400 ns long. Additional pulse widths could be used to provide a multi-property pulse if suitable changes are made to the signal-property identification logic.

In the following description of logic circuit diagrams reference will be made to the two states which are normally found in any such logic circuits. These two states may be considered to represent binary signals and are often referred to as a Logic-One and Logic-Zero. In addition, the low and high voltage states respectively are sometimes referred to as a "Binary-Zero" and a "Binary-One", or as "false" and "true" signals or states. In the case of an AND gate, for example, if the two inputs are raised to a predetermined voltage level (which may be referred to as "true"), the output similarly changes to that voltage level (referred to as "true"), while if either of the inputs remains at a different, perhaps lower voltage level, (known as "false"), the output of the AND-gate stays at the low level (in the "false" state). Similarly, in the following discussion, the two states of a logic circuit will frequently be referred to as "true" and "false" states.

When controller 18 (FIG. 1) transmits an interrogation pulse in the first state, the pulse propagates through interrogation channnel 90, through switch 44 to line receiver 48, through switch 50 to line driver 52, switch 46, and on to the next data acquisition unit in sequence. The pulse also passes through delay line 72. At the end of 1000 ns, the leading edge of this pulse emerges from the exit of the delay line but at this point the trailing edge of the pulse is still visible at the entry of the delay line. Accordingly, both inputs to AND-gate 74 to "true", or to active levels for activating AND-gate 74 thereby generating a 200-ns signal on line S1, having a positive-going leading edge. As previously described, when controller 34 (FIG. 2) detects a signal on line S1, it resets multiplexer 24. The trailing edge of the wide interrogation pulse will generate a positive-going logic level on line S2, the output of inverter 76, 200 ns after S1 goes "true".

An interrogation pulse in the second, narrow, state propagates through channel 90 to delay line 72 and to inverter 76. Since the pulse width is too narrow to be seen simultaneously at the entrance and exit of delay line 72, no signal will be generated on line S1. However, the trailing edge of the narrow pulse will appear at the output of inverter 76 as an positive going signal on line S2. When controller 34 detects positive going S2 signal, as mentioned previously, it will advance multiplexer 24 to the next input channel in sequence, initiate a convert cycle, and output a data signal through channel 92' to recording means 20.

As above described, each data acquisition unit may have 14 analog input channels. Accordingly, to sample each input channel in sequence, an interrogation pulse in the first state is first transmitted by control means 18. As the wide interrogation pulse propagates along interrogation channel 90 to each data acquisition unit in sequence, it resets multiplexer 24 contained in each unit. Thereafter, a series of 13 interrogation pulses in the second state are transmitted. Each pulse in the second state advances multiplexer 24 to sample in turn, each one of the input channels 22 and to transmit the corresponding data signals from the data acquisition units 14, 14', 14'', 14''' to recording means 20 through data channel 92.

In a preferred embodiment, the 14 channels are sampled within one millisecond (thousandth of a second); accordingly, the interval between S2 pulses will be 71.4 microseconds (millionths of a second). The two-way pulse propagation delay through telemeter link 16 between any two data acqustion units, provides a time window during which the data signals can be transmitted from the respective data acquisition units 14, 14', 14'', 14''' without mutual interference.

Bypass switches 44, 46, and 64, 66 are relay-activated by any well-known means and are shown in the power-on position. In the event of a power failure in a particular data acquisition unit, both sets of switches will switch to bypass lines 68 and 70. Thus, interrogation pulses and data words to and from other more remote data acqustion units pass freely through the defective unit over bypass lines 68 and 70.

A data acquisition unit such as 14' may become defective requiring it to be bypassed or it may become desirable to terminate further transmission of an interrogation pulse at a specified unit. These special functions are enabled by a control signal, in a manner to be described.

The total travel time of the interrogation pulse to a remote data acquisitionn unit, such as 14' depends on the propagation delay time through the interrogation channel to the unit. The travel time to unit $n$ is the sum of the propagation delays between all previous data acquisition units. Similarly, the propagation delay time of a control pulse through the control channels to unit $n$ is the sum of the delays in the control channel between all previous units closer to control means 18 than unit $n$. Since the propagation velocities through the two channels are different, at the $n$th data acquisition unit, a pulse propagating through the faster channel will arrive $(n-1)R$ earlier than the pulse through the slower channel, where $n-1$ is the number of spaces between the first $n$ data acquisition units and R is the signal travel-time difference, through the two channels, between consecutive units. Preferably the lead-in section between the central data processor and the first acquisition unit 14 is so constructed that the propagation delays for both signals through channels 90 and 91 are the same and all differential delays are generated in the lines between successive acquisition units.

For purposes of illustration, but not by way of limitation, assume that the pulse propagation velocity is greater in the control channel than in the interrogation channel. Accordingly, if an interrogation pulse is transmitted from controller 18 (FIG. 1) and $(n-1)R$ later a control pulse is transmitted by controller 18, the control pulse will overtake and intercept the interrogation pulse at unit $n$.

It should be understood that both the interrogation and control transmission links could be characterized by identical propagation velocities. Delay lines can be inserted in one of the two channels at each data acquisition unit to create an effective propagation velocity difference. For example, a delay line 78 (shown by a dashed box in FIG. 3) can be inserted in the interrogation channel between line receiver 48 and disabling switch 50. Additionally, delay line 78 could serve as a substitute for delay line 72.

First signal or pulse coincidence detector 40 includes a D-type flip-flop 80 and a relay 82 associated with switches 64 and 66. The switches are shown in the relay power-on position. D-type flip-flop 80 may be one half of a 74S74 dual, positive edge-triggered flip-flop such as made by Texas Instrument Co. A D flip-flop is a bi-stable memory circuit with a single input (D), and Q and $\overline{Q}$ outputs. The logic level present at the D input is transferred to the Q output when the proper edge (i.e. transition from one logic level to another) occurs at the CK (clock) input. The flip-flop remains in that state until reset. Flip-flop 80 responds to the rising edge (negative to positive transition) of a pulse. The $\overline{Q}$ output always assumes a logic level opposite to the Q logic level. The flip-flop may be reset by applying a pulse to the CL (clear) input. When reset, the logic level of the Q output is a logic ZERO and the $\overline{Q}$ output is a logic-ONE.

In response to the simultaneous presence of both a control pulse and an interrogation pulse in any state, first signal coincidence detector 40 becomes active. The leading edge of an interrogation pulse sets or activates the D input of D-type flip-flop 80 to a logic-ONE. The Q output of flip-flop 80 is normally false (logic-ZERO) thereby activating relay 82 to hold switches 64 and 66 closed, as illustrated in FIG. 3. If a control pulse arrives at the CK input while the D input is a logic-ONE, flip-flop 80 will be toggled to set the Q output to a logic-ONE or true. When Q goes true, relay 82 is released, causing switches 64 and 66 to make contact with bypass line 68 because the logic-ONE voltage level is the same as +V.

Referring now to FIG. 4, in a preferred embodiment, controller 18 transmits an interrogation pulse through interrogation channel 90, which has the lesser propagation velocity. Control channel 91 is connected to controller 18 through a tapped delay line 132 having taps to provide integral multiples of the delay time such as O, R, 2R, 3R, (N-1)R via tap selector switch 100.

To bypass channel $n$, an interrogation pulse is first transmitted by controller 18 (FIGS. 1 and 4) annd then $(n-1)$ later a control pulse is transmitted. The control pulse will intercept and become coincident with the interrogation pulse at channel $n$, deactivating relay 82 (FIG. 3), thereby switching switches 64 and 66 to bypass line 68. Expressed more simply, the control pulse is delayed with respect to the interrogation pulse by an integral multiple of the delay time R. The integral multiple is equal to the number of data acquisition units intervening between unit $n$ and the central processing unit.

It may become desirable to disable further travel of an interrogation pulse to units positioned beyond data acquisition unit $n$. To perform this function, the control pulse is time-shifted so as to follow an interrogation pulse after a delay of $(n-1)R+d$ where $d$ is the time shift. This function is performed by second pulse coincidence detector 42.

Referring again to FIG. 3, in second pulse coincidence detector 42, the D input of flip-flop 84 is connected to a tap 85 on tapped delay line 72. The delay time between entry of the leading edge of the pulse at tap 85 is equal to or slightly longer than the width of the pulse. In a preferred embodiment the delay time $d$ to tap 85 is 600 ns. As previously described, in pulse coincidence detector 40, when the interrogation pulse arrives, it will first activate flip-flop 80. At a time $d$ later (600 ns later for example), the leading edge of the pulse appears at tap 85 of delay line 72. The time-shifted control pulse is too late to trigger the CK input of the flip-flop 80, hencce the pulse coincidence detector 40 is unresponsive. However, the D input of flip-flop 84 will now become activated by the delay interrogation pulse. Therefore, a time-shifted control pulse arriving at the CK input of flip-flop 84 will toggle flip-flop 84, causing the normally true $\overline{Q}$ output to go false (logic-ZERO). When $\overline{Q}$ of flip-flop 84 goes false, relay 86 is activated, opening disabling switch 50, thereby terminating further travel of the interrogation pulse to units positioned beyond data acquisition unit $n$.

Referring now to FIG. 4, the time shift $d$ is imparted to the control pulse by a fixed delay line 102 when switch 104 is in the position shown in the figure. The time delay $d$ through delay line 102 is the same as the time delay at tap 85 of delay line 72 or 600 ns in the illustrative system.

If either flip-flop 80 or 84 is toggled by the simultaneous presence of an interrogation pulse and a control pulse, it will remain in the toggled condition until cleared. Flip-flops 80 and 84 will be cleared only in response to an interrogation pulse in the first state, but in the absence of a coincident control pulse, when the output of AND-gate 74 goes to a logic-ONE.

In a preferred, inproved embodiment of this invention, in addition to the features described above, it is also desired to enable or activate certain switching sequences and to output data from a subset of consecutive data acquisition units, selected from among the totality of all of the units. Further, these functions are also accomplished by use of two transmission paths having different delays. The selected subset may include as few as one or as many as all of the data acquisition units deployed as above described. If more than one unit comprises the selected subset, there is a first selected unit and a last selected unit of which the first selected unit is closest to the central processing unit 12.

Figure 5:
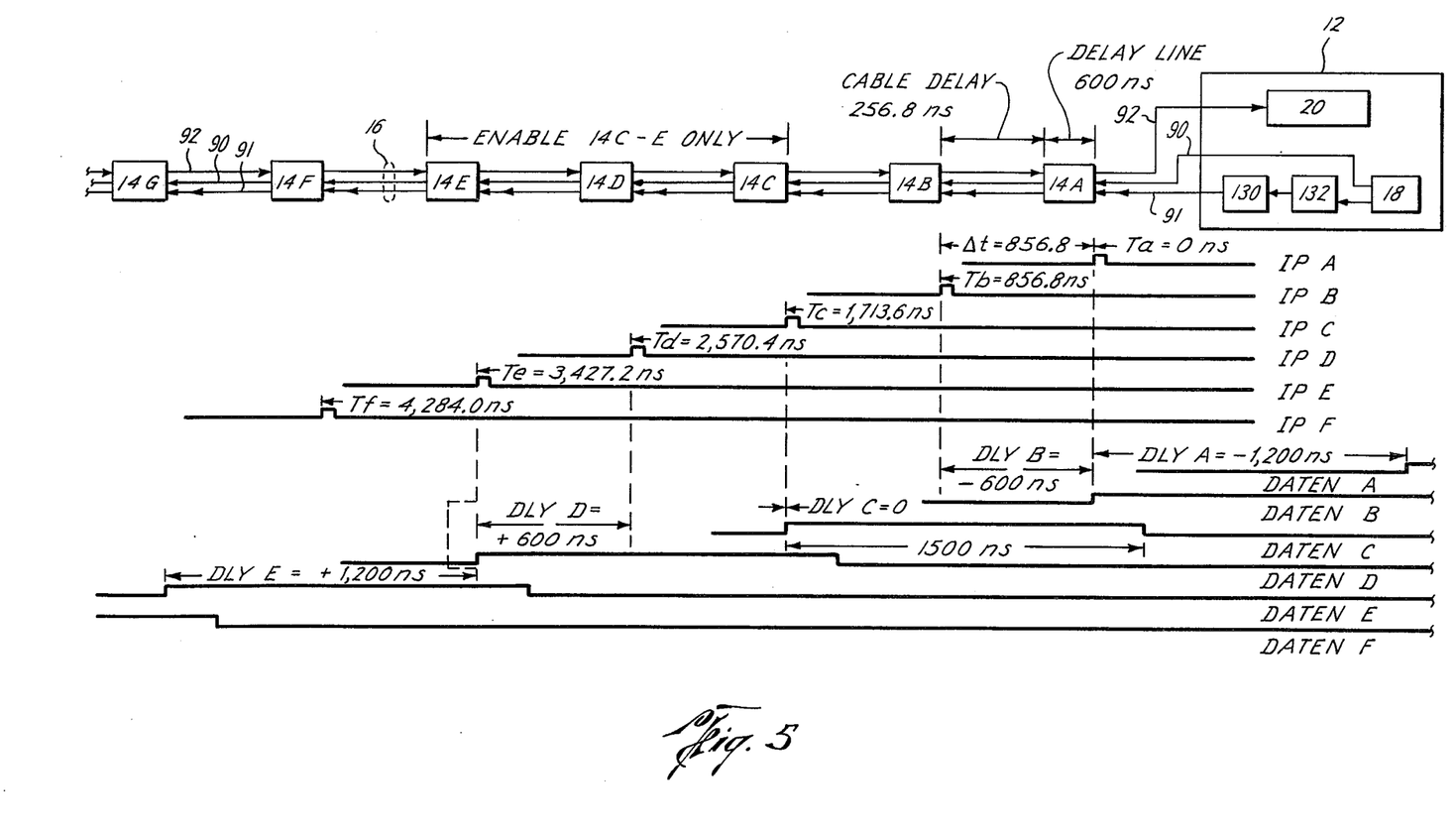
FIG. 5 is an expansion of FIG. 1 showing seven data acquisition units of which three consecutive units are to be achieved and a timing diagram showing the time relationships of the control and interrogation pulses with respect to the data acquisition units.

In FIG. 5 for example, seven data acquisition units 14A-G are connected to central processing unit 12 through telemeter link 16, consisting of the three channels: interrogation channel 90, control channel 91 and data channel 92. Note that the array of FIG. 4 is reversed in direction from the array of FIG. 1, and that, for simplicity, input channels 22 are not shown. Also, in the illustrative example of FIG. 5, the double arrows on control channel 91 indicate that the signal propagation velocity is greater in that channel than the signal propagation velocity through interrogation channel 90, although this example is not to be considered to be a limitation.

In accordance with the example of FIG. 5, it is desired to activate and initiate a scan cycle or switching sequence in multiplexer 24 (FIG. 2) thereby to enable output of data from the respective input channels of the subset of units 14C-E only. Units 14A-B and 14F-G are to remain inactive. Circuitry to activate or enable the desired subset of units is shown in FIG. 6.

Figure 6:
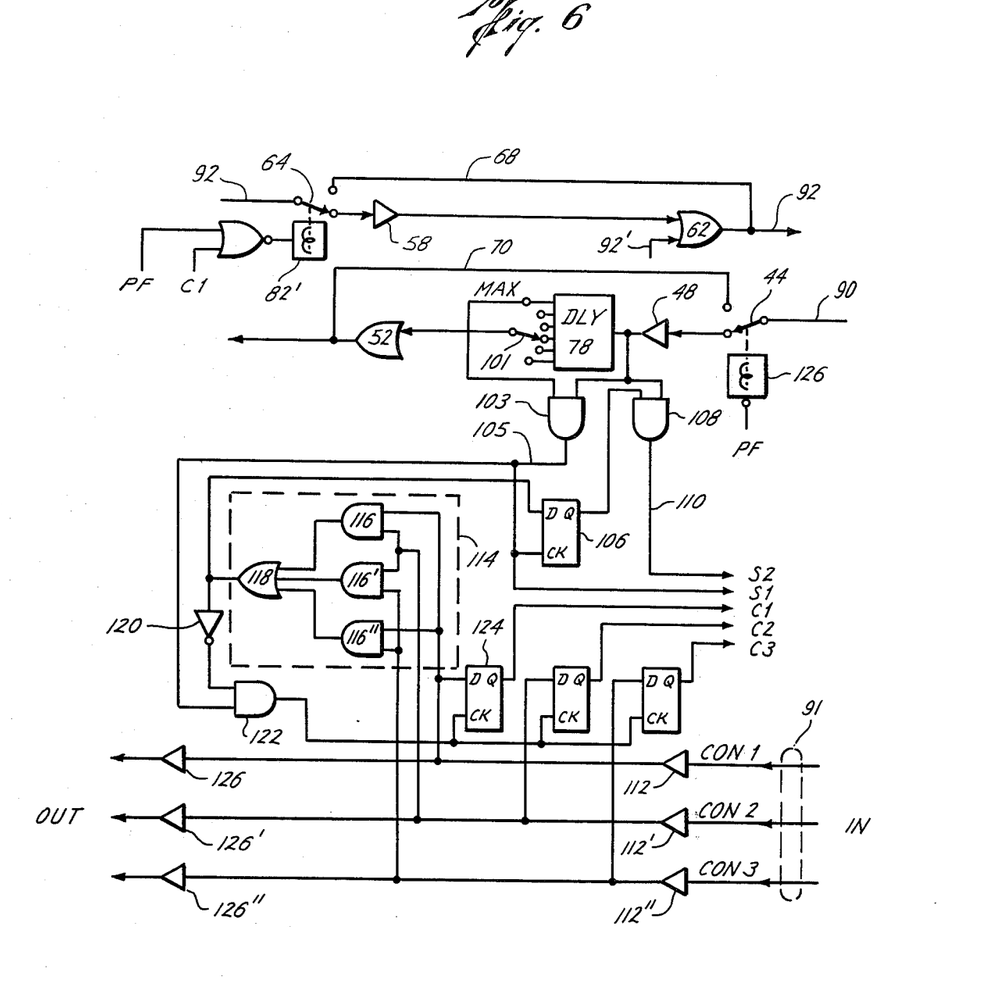
FIG. 6 illustrates an alternate embodiment of the control and interrogation circuits of FIG. 3.

In FIG. 6, the data bypass circuit is substantially equivalent to that of FIG. 3. However, signal property identifier 38 is, in FIG. 6, designed around optional delay line 78 of FIG. 3. Pulse coincidence detectors 40, 42 of FIG. 3 are differently designed in FIG. 6 to allow greater flexibility of operation.

Interrogation channel 90 is shown as a single physical channel in FIG. 5. Control channel 91 is shown by a single line in the above Figure but actually it consists of three redundant lines as will be more fully discussed later. In one embodiment the interrogation and control channels may be twisted wire pairs. The pulse propagation velocity through the wire lines comprising the interrogation and control channels, may have the same value. However delay line 78 in each acquisition unit is connected in series with the interrogation channel. Hence, in the illustrative system, the effective velocity is less in the interrogation channel than in the control channel. Thus, delay line 78, retards the propagation of the interrogation pulse by a fixed time interval at each data acquisition unit. Delay line 78 has a maximum delay of 1000 ns with taps to providde shorter delays and to adjust for minor differences in the lengths of the wire line making up the interrogation channel. The preferred delay or retardation is 600 ns.

In FIG. 6, an interrogation pulse transmitted from controller 18, propagates along line 90, to line receiver or buffer amplifier 48 via power failure bypass switch 44, into delay line 78. Six hundred nanoseconds later, the pulse proceeds through tap 101 to line driver 52 and on to the data acquisition unit next in line.

AND-gate 103 detects the presence of a wide S1 pulse. Since the S1 pulse is 1200 ns wide and the maximum delay of delay line 78 is 1000 ns, the output line 105 of AND-gate 103 will change to logic-ONE, as discussed above, triggering the CK (clock) input of D-type flip-flop 106. If a logic-ONE is present at the D input of flip-flop 106 (from a control pulse as discussed below), the Q output will also become and remain a logic-ONE, thereby causing the output of AND-gate 108 to go to a logic-ONE. The trailing edge of the S1 pulse will therefore also generate an S2 pulse to cause controller 34 (FIG. 2) to initiate a convert cycle. So long as the D input of flip-flop 106 remains at logic-ONE, AND-gate 108 will remain enabled. For the remainder of a scan cycle, subsequent incoming S2 pulses will appear on S2 output line 110. Conversely, if the D input of flip-flop 106 is logic-ZERO, output of S2 pulses through AND-gate 108 will be inhibited and the circuitry of FIG. 2 will not be activated.

Control or DATEN (date enable) pulses are transmitted in parallel over triple redundant control channel 91. The DATEN pulses are received by line receivers 112, 112', 112" and are transmitted to majority-vote circuit 114. Circuit 114 consists of AND-gates 116, 116', 116" and OR gate 118. A DATEN pulse present on any two of the three lines CON1-3 will cause the output of OR-gate 118 to become a logic-ONE, setting the D input of flip-flop 106 also to logic-ONE, thereby enabling AND-gate 108. Thus, the simultaneous presence of an S1 pulse and a DATEN pulse on any two of the three lines CON1-3, will generate a unique signal to enable data output from output register 32 (FIG. 2) in response to subsequent S2 pulses received during the remainder of the scan cycle. The system will remain enabled so long as a DATEN pulse is present each time that an S1 pulse is received. DATEN pulses propagate outwards from the unit under consideration to more remote units, through line drivers 126, 126', 126''.

A desired switching action in a selected data acquisition unit may be enabled by sending a DATEN control pulse over a single control line such as CON-1. When a DATEN pulse appears on only one line such as CON-1, the output of majority vote circuit 114 will be a logic-ZERO. The output of inverter 120 will therefore go to logic-ONE, enabling AND-gate 122. When an S1 pulse is received at the same time as the DATEN pulse over the single line CON-1, the output of AND-gate 122 will go true, setting the CK input of flip-flop 124. Since the D input of flip-flop 124 is also true, because of the presence of the DATEN pulse on line CON-1, the Q output will go true, generating a C-1 pulse. A C-1 control pulse may be used for example to deactivate data bypass relay 82'. Bypass relay 82' is normally held in the position shown unless a C-1 pulse or a power failure (PF) deactivates the relay to cause data from a more remote data acquisition unit to be bypassed around the unit in question. DATEN pulses sent through individual lines CON-2 or CON-3 will similarly generate control signals C-2, C-3 to perform other selected control functions. The width of a DATEN pulse, used for activating a desired switching action in a selected unit will be one-half the width of an S1 interrogation pulse, or about 600 ns.

Referring now to FIG. 5, activation of one or more data acquisition units, requires the simultaneous presence of an S1 pulse and a DATEN pulse at each of the units. In FIG. 5 a plurality of data acquisition units 14A-G are disposed remotely with respect to a central processing unit 12. It is desired to activate or enable only the three consecutive units 14C-E and no others.

An S1 pulse is transmitted from central processor unit 12 through the interrogation channel to each unit 14 in sequence. Let the instant of arrival of S1 at 14A be $t_a = 0$. The S1 arrival time at 14B will then be $t_b = 856.8$ nanoseconds. The pulse propagation time-delay between 14A and 14B is made up of the cable delay and the 600-ns delay in delay line 78 (FIG. 6). The length of the cable between the two units is 196.8 feet; the pulse propagation velocity is 1.305 feet/ns. Accordingly since the cable delay is therefore 256.8 ns, and the delay line time is 600 ns, the total delay is 856.8 ns. Hence the S1 arrival time at 14C will be $t_c = 1713.6$ nanoseconds, etc., as shown in FIG. 5. The six timing lines in FIG. 5 labeled IPA-IPF, represent the location of the same S1 interrogation pulse with respect to each of the data acquisition units 14A-F at the end of each 856.8 nanosecond interrogation-pulse travel-time interval.

Some time after an S1 pulse is transmitted through interrogation channel 90, a DATEN pulse is transmitted through the control channel 91. The signal propagation velocities in the twisted pairs comprising the interrogation and control channels 90 and 91 are the same. However because of the 600-nanosecond delay line 78 in each unit, the effective S1 pulse velocity is slower than the control pulse velocity because there are no equivalent delay lines in the control channel. Of course, in an alternate embodiment, the cable velocities for the two channels can be chosen such that the required delays would be inherent in the channels themselves, the taps in delay line 78 would then be used only to compensate for slight differences in cable lengths.

A DATEN pulse transmitted 1200 nanoseconds after transmission of a corresponding S1 pulse, will intercept the S1 pulse at the third unit 14C. The six timing lines labeled DATEN-A-F show the position of a DATEN pulse with respect to the S1 pulse at the end of each 856.8 nanosecond interrogation-pulse travel-time interval. Referring again to FIG. 5, when an S1 pulse arrives at the unit 14A, no action will occur at 14A because the DATEN pulse is lagging 1200 nanoseconds behind the S1 pulse. At unit 14B, the DATEN pulse is 600 nanoseconds behind the S1 pulse, so again no action will take place at 14B. The DATEN pulse intercepts the S1 pulse at unit 14C, so the data-processing circuitry in 14C is enabled. At 14D, the leading end of the DATEN pulse is ahead of the S1 pulse, by 600 nanoseconds, but because of the width of the DATEN pulse, a control signal is still available to enable the unit 14D. At 14E, although the leading edge of DATEN is 1200 nanoseconds in advance of S1, its trailing edge has not yet passed the S1 pulse; hence unit 14E is also enabled. Finally, by the time the S1 pulse arrives at 14F, the trailing edge of the DATEN pulse is well ahead of the S1 pulse. Therefore, unit 14F and all subsequent data acquisition units will not be enabled. All units that are enabled by coincident S1 and DATEN pulses, will remain active for one entire scan cycle. That is, they will be responsive to all subsequent incoming S2 pulses for the remainder of the scan cycle. The desired delays are applied by means of tapped delay line 132 (FIGS. 4 and 5).

The width W of a DATEN pulse is equal to $$W = (L-1) \times DLY + dt$$

where
L = number of data acquisition units to be enabled,
DLY = artificial delay line time (delay line 78), and
$dt$ = a small time increment of arbitrary length to allow for slight propagation time differences.

In the example of FIG. 5, the width of the DATEN pulse is $$W = (3-1) \times 600 + 300 = 1500 \text{ nanoseconds.}$$

The width of the control pulse can be varied by means of the pulse width adjust circuit shown as 130 in FIG. 5 connected to controller 18 in central processor 12. The pulse-width adjust circuit may be a monostable or one-shot multivibrator such as National Semiconductor device DM 74121. A one-shot multivibrator is a circuit or device which can be used to modify the duration of a control pulse by stretching or shortening the pulse width. Pulse width adjustment is accomplished by changing the time constant of a conventional RC feedback network connected to the control inputs of the one-shot circuit.

The initial delay time ID, to be applied to the DATEN pulse by delay line 132, is $$ID = M \times DLY,$$

where M is the number of intervening units to be skipped between the central processor unit and the first active data acquisition unit (refer to FIG. 4).

As discussed earlier, a CON-1 pulse coincident with an S1 pulse is used to bypass data around a selected data acquisition unit. The delay BD to be applied to the CON-1 pulse by delay line 132, relative to an associated S1 pulse, is $$BD = K \times DLY,$$

where K is the number of data acquisition units intervening between the central processor unit and the selected data acquisition unit.

Note that the triple redundant control lines of FIG. 6 are shown as single lines in FIGS. 1 and 5, in order to simplify the drawings.

From the above description and formulas, it may be seen readily that by proper selection of control pulse width and control pulse delay with respect to an S1 pulse, any subset of consecutive data acquisition units can be enabled. As an example, for the first scan, the three units 14A-C would be activated. For the second scan, units 14B-D are enabled; for the third scan, units 14C-E, etc.

Employing the roll-along technique, for the first scan noted above, the control pulse width will be $(3-1) \times 600 + 300 = 1500$ ns. The initial delay will be zero because there are no intervening units between 14A and central processor 12. For the next scan, the pulse width will remain the same but the initial delay will be 600 ns because there is one unit, unit 14A, between the first selected unit 14B and central processor 12, etc.

Of course, in conducting a seismic survey, an acoustic wave is generated and seismic reflection data are received during a recording cycle of many seconds. Accordingly, many successive scans will be made, employing the same subset of data acquisition units. For a 6-second recording, using a sample interval of 1 millisecond, there will be 6000 scans. After the first recording cycle, the system is "rolled along" to the next subset of data acquisition units, by shifting the delay and a new recording cycle of 6000 scans is commenced.

As mentioned above, an S1 pulse is transmitted from the central processor to the data acquisition units once every millisecond (thousandth of a second), thus defining a one-millisecond sample interval. Thereafter, if there are fourteen input channels 22, a series of thirteen S2 pulses are transmitted at 71.4 microsecond intervals.

As discussed in co-pending U.S. Patent applications Ser. No. 664,618 and 664,617 the frequency of the transmitted interrogation pulses is related to the frequency of the reflected seismic signals. For high-frequency signals on the order of 200 Hz (cycles per second), the sample interval should be one-half to one millisecond (2000 to 1000 samples per second). For seismic signals in the lower end of the spectrum such as 20–30 Hz, the sample interval may be 2 or even 4 milliseconds (500 Hz or 250 Hz).

As is well known in the seismic art, for the first part of a seismic recording cycle, say the first one-half to one second, high frequency signals, from shallow subsurface geological layers, are received. Further, these are received at sensor units nearer the shot point as the reflected signals have not had time to reach sensor units at more remote parts of the cable. Later in the recording cycle, the seismic signals reflected from deeper geologic layers are characterized by much lower signal frequencies.

At the beginning of the recording cycle, for the first one second for example, it is desired to sample the seismic data at a one-half millisecond sample interval, using only data acquisition units and associated seismic sensors close to the central processing unit 12, such as units 14A-D. Accordingly, an S1 pulse and a DATEN control pulse are transmitted from central processor unit 12. The width, of the DATEN pulse will be, for the four units 14A-D, $$(4-1) \times 600 + 300 = 2100 \text{ ns.}$$

The initial delay of the DATEN pulse will be zero because there are no units intervening between central processor unit 12 and the first data acquisition unit 14A.

At the end of 2000th scan (one second) and for the remainder of the recording cycle, the seismic data from input channels 22 (FIG. 1) may be sampled at less frequent intervals such 2-millisecond sample intervals and all of the data acquisition units will be enabled. Thus, for the 2001st scan, a new control pulse having a greater width will be transmitted concurrently with the S1 pulse. The width of the new control will be $$(7-1) \times 600 + 300 = 3900 \text{ ns}$$

to enable the seven data acquisition units 14A-G. The initial delay will be zero as before. Alternatively the DATEN pulse may be "on" throughout during the entire recording cycle, i.e. be of "infinite" length since all data acquisition units are to be enabled.

While this invention has been described with respect to particular embodiments, it is of course not limited thereto. For example, interrogation and control channels may be combined into one physical transmission channel by any of several well-known multiplexing means such as code-modulation. For example, interrogation signals and control signals may be coded differently and decoded at each acquisition unit after which different delays are applied to the two signals prior to transmission to the next acquisition unit. Even though the physical transmission lines are the same, in the terminology of the communication arts, two separate channels are considered to exist.

Also, while the present invention has been described in terms of equally-spaced data acquisition units, it is possible to apply the same principles to unequally spaced units by constructing the sequential delay taps of FIG. 4 to correspond in sequence to the actual differences between delays in the signal and control transmission channels.

Moreover, while the novel features of this invention have been described with specific application to digital seismic data acquisition system they are not restricted thereto.

What is claimed is:
1. A seismic exploration system comprising:
   a seismic cable;
   a plurality of seismic data acquisition units spaced along said cable;
   first and second transmission lines having different signal propagation velocities along said cable, included in said cable and connected to all of said data acquisition units; and
   means at each of said data acquisition units responsive to signals received over both of said transmission lines for initiating a desired switching action at said data acquisition unit, wherein each said unit initiates said switching action only upon the substantially concurrent presence of said signals at said units.

2. A seismic exploration system as defined in claim 1 wherein means are provided for bypassing a selected data acquisition unit upon receipt of coincident signals arriving over said two transmission lines.

3. A seismic exploration system as defined in claim 1 wherein means are provided for enabling the transmission of data from only those data acquisition units receiving signals over both of said transmission lines concurrently.

4. A seismic exploration system as defined in claim 1 wherein means are provided for applying a signal to each of said transmission lines, with one of the signals being delayed in time of application relative to the other to initiate a switching action at least one selected acquisition unit along said cable.

5. A seismic exploration system as defined in claim 1 wherein said acquisition units are substantially identical.

6. A seismic exploration system as defined in claim 1 wherein means are provided for varying the width of at least one of said signals to select a desired number of said data acquisition units.

7. A seismic exploration system as defined in claim 4 wherein means are provided for varying the delay between the application of said two signals to the two transmission lines to change the selected units.

8. A seismic exploration system for enabling a desired switching sequence in a subset of seismic data acquisition units selected from a plurality of substantially identical such units remotely disposed in consecutive order, the subset including at least one said unit, the system comprising:
   a central transmitter means for transmitting control signals;
   first and second signal transmission channels for interconnecting said seismic data acquisition units with said transmitter means;
   means in said transmitter means for applying a first control signal to said first transmission channel at timed intervals;
   means for retarding propagation of said first control signal along said first transmission channel by a known time increment corresponding to each said data acquisition unit relative to signal propagation along said second channel;
   means in said transmitter for applying a second control signal to said second transmission channel and means for delaying the time of application of said second control signal onto said second transmission channel with respect to said timed intervals of application of said first signal by a first integral multiple of said known time increment; and
   detector means in each said data acquisition unit for sensing the simultaneous presence of the two control signals as a unique control signal.

9. A seismic exploration system as defined in claim 8 wherein each said seismic data acquisition includes delay means in series with said first transmission channel.

10. The seismic system of claim 8 wherein each seismic data acquisition unit includes switching means for enabling said desired switching sequence in response to said unique control signal.

11. The seismic system of claim 8 wherein said selected subset includes as its members at least some of said plurality of data acquisition units, there being a first selected unit and a last selected unit, and wherein said transmitter means includes means for adjusting the width of said second control signal by a second integral multiple of said known time increment to vary the number of units included in said subset and means for varying the delay of application of said second control signal to change the selected units.

12. The system of claim 8 wherein said control signals are substantially square wave pulses.

13. The seismic system of claim 8 wherein each said seismic data acquisition unit further includes:
   a plurality of analog input channels;
   a like plurality of seismic sensor units for providing analog signals to said input channels;
   common electronics means for sampling, conditioning, and digitizing said analog signal samples as digital data words and output register means for receiving said digital data words;
   channel selector means for successively coupling said analog input channels to said common electronics in response to said unique control signal;
   signal receiving means associated with said transmitter means for receiving digital data words; and
   transmission channel means for receiving digital data words from said output register in each said data acquisition unit and for transmitting said digital data words to said signal receiving means.

14. A seismic data multiplexing and telemetry system for connection to a central processor comprising:
   a plurality of spaced-apart data acquisition units disposed remotely from said central processor, each said unit including a plurality of input channels for receiving analog signals, common electronics means for sampling, conditioning, and digitizing analog signal samples from said plurality of input channels as digital data words, and output register means for receiving said digital data words;
   a plurality of seismic sensors for providing analog signals to said input channels;
   channel select means including output registers in each said unit for successively coupling each said input channel with said common electronics means;
   data transmission channel means for receiving digital data words from said output registers in each said data acquisition unit and for transmitting said digital data words to said central processor in time division multiplexed sequence;
   means for transmitting scan-interval interrogation pulses to said data acquisition units at selected scan-cycle intervals;
   means associated with each said data acquisition unit for retarding said interrogation pulses by a known time increment;
   means in said central processor for transmitting a control pulse to each said data acquisition unit and means for delaying the time of transmission of the control pulse from the central processor with respect to the transmission time of said interrogation pulse, the transmission delay time being a first integral multiple of said known time increment; and
   means in each said acquisition unit for sensing the simultaneous presence of the two pulses as a control signal for resetting said channel select means and for activating said output enabling means to allow output of digital data words from said output register during a scan cycle.

15. A seismic system as defined in claim 14 including:

means in said central processor for transmitting to said data acquisition units a plurality of submultiple interrogation pulses at integral submultiples of said scan-cycle interval; and means in each said data acquisition unit for detecting said submultiple interrogation pulses and means responsive to each said pulse for advancing said channel select means to each said input channel in succession, and means for outputting digital data words to said data transmission channel when said output enabling means is activated.

16. A system as defined in claim 15 wherein:
said scan-interval and said submultiple interrogation pulses constitute substantially square waves and said scan-interval pulse is at least twice as wide as said submultiple pulse.

17. A system as defined in claim 16 including:
subset-selecting means for activating said output enabling means in the members of a subset of data acquisition units selected from among said plurality of units, the subset including first and last selected units, said subset-selecting means including means for adjusting the width of said control pulses by a second integral multiple of said known time increment, whereby said first integral multiple determines the number of data acquisition units intervening between said first selected unit and said central processor, and said second integral multiple determines the number of the members of the selected subset of data acquisition units.

18. The seismic system as defined by claim 15 wherein said transmitter includes means for applying a number of submultiple pulses equal to the number of input channels, less one.

19. The system as defined by claim 14 including:
control channel means for transmitting control signals to said data acquisition units, said control channel means including three redundant twisted-wire pairs; and
majority vote means in each said data acquisition unit for sensing the presence of a control pulse on any two of said three wire pairs as a first control pulse.

20. The system as defined in claim 14 including:
means for transmitting a control signal through any single one of said three wire pairs; and
means in each said data acquisition unit for sensing the presence of a control pulse on any single one of the respective wire pairs as second, third, and fourth control signals.

21. A seismic method for signaling members of a subset of seismic data acquisition apparatus selected from a plurality of remotely disposed seismic data acquisition apparatus, the subset including at least one said apparatus, the method comprising:
transmitting a first signal to said seismic data acquisition apparatus;
transmitting a more rapidly traveling second signal to said seismic data acquisition apparatus; and
delaying transmission of said second signal with respect to said first signal so that said first and second signals arrive substantially simultaneously at said selected subset of seismic apparatus.

22. The seismic method of claim 21 wherein said subset includes as its members at least some of the plurality of apparatus, there being a first and a last selected apparatus, including the further step of adjusting the width of said delayed second signal to make the leading edge of said second signal and said first signal arrive substantially simultaneously at the first selected unit and to make the trailing edge of said second signal pass beyond said last selected unit, just after the arrival of said first signal whereby there is coincident presence of said two signals at every one of said selected subset of apparatus and at no other apparatus.

23. The seismic method of claim 22 including the steps of sensing, as a unique condition, the coincident presence of both of the said signals by each said member of said selected subset of apparatus, and producing a control signal at each selected apparatus upon the sensing of said unique condition.

24. A seismic method for enabling a desired switching sequence in the members of a subset of multichannel seismic data acquisition units, the subset being selected from a plurality of identical such units, and said subset including as its members at least one said unit, comprising the steps of:
disposing the plurality of data acquisition units in spaced-apart, consecutive order remotely with respect to a signal transmitter;
linking said plurality of data acquisition units to the transmitter by first and second transmission channels;
transmitting a first signal through said first transmission channel;
retarding propagation of said first signal at each said data acquisition unit by a constant selected time increment;
transmitting a second signal through said second transmission channel;
delaying the time of application of said second signal to said second transmission channel with respect to the transmission of said first signal by an integral multiple of said selected time increment so that said first and second signals are present substantially simultaneously at the members of said subset; and
sensing the simultaneous presence of the two signals as an enabling signal.

25. The seismic method of claim 24 wherein said selected subset includes as its members at least some of said plurality of data acquisition units, there being a first and a last selected unit, including the steps of:
adjusting the width of said second signal by a first integral multiple of said selected time increment and delaying transmission of said second signal by a second selected multiple of said time increment so that said first and second signals arrive at the first selected unit substantially simultaneously, and said first signal arrives at said last selected unit before the trailing edge of said second signal travels beyond said last selected unit; and
sensing the simultaneous presence of the two signals at each said member of said subset as an enabling signal for each said member, wherein the integral multiplier of said first integral multiple is equal to the number, less one, of data acquisition units included in said subset; and
the integral multiplier of said second integral multiple is equal to the number of data acquisition units intervening between said transmitter and said first selected unit.

26. The seismic method of claim 25 including:
repeatedly transmitting said first and second signals for enabling a first plurality of switching sequences at first selected time intervals;

adjusting the width of said second signal to enable said desired switching sequences in at least a first plurality of data acquisition units;
repeatedly transmitting said first and second signals for enabling a second plurality of switching sequences at second selected time intervals; and
adjusting the width of said second signal to enable said desired switching sequences in all of a second plurality of data acquisition units.

27. The method of claim 26 wherein:

said first selected time interval is less than 1 millisecond and said first plurality of switching sequences includes at least 500 such operations; and
said second selected time interval is at least one millisecond and said second plurality of switching sequences includes at least 1000 such operations.

28. The seismic method of claim 25 including the steps of:

initiating a plurality of successive recording cycles at predetermined recording cycle intervals; and
delaying transmission of said second signal by a different multiple of said selected time increment for each successive recording cycle.

* * * * *